Feb. 15, 1944.  W. MÖLLER ET AL  2,341,644

AUTOMATIC STEERING DEVICE

Filed March 29, 1940

INVENTORS
WALDEMAR MÖLLER
ADAM KRONENBERGER
BY
Herbert H. Thompson
their ATTORNEY.

Patented Feb. 15, 1944

2,341,644

UNITED STATES PATENT OFFICE 2,341,644

AUTOMATIC STEERING DEVICE

Waldemar Möller, Berlin-Zehlendorf, and Adam Kronenberger, Berlin - Halensee, Germany; vested in the Alien Property Custodian Application March 29, 1940, Serial No. 326,648
In Germany December 12, 1938

4 Claims. (Cl. 244—78)

The invention refers, in general, to automatic steering arrangements by which is also meant, in general, the so-called "regulator" arrangements. This is intended especially for application to automatic control of aircraft.

With automatic steering arrangements for airplanes, angular speed and in some cases also angular acceleration as well as eventual further control values aside from the control necessitated by the plane's flying position, are impressed on the power switch. To attain a perfect steering control action, the various control impulses must be tuned to each other's magnitude.

To facilitate the correct, reciprocal measurement of the impulses, it has already been suggested to include a spring between the control transmitter and the power switch for the servo unit. Through the choice of springs of various stiffness, the influence of the individual control transmitter on the power switch can be changed in a simple manner.

The present invention distinguishes itself from the aforementioned arrangements in that the resilient, springy connection between the control transmitter and the power switch is so maintained under initial tension that the spring yields only after the passing of the highest control values and limits same, in case of further deflection of the measuring system, to a constant value.

In this manner, a limitation of the control value of a desired magnitude is possible without changing the sensitivity of the control transmitter. On the other hand, a strict linear dependence between the signal departure and the control value is gained in that only the middle part of the line indicating the steering direction is used since the generally strongly flattened divergence of parameters is cut off.

The control values can further be made use of for navigation by means of distant indication. Up to the present time this was, in general, not possible as, for example, with automatic steering a deviation of a few degrees from the set course the final value of the steering impulse should be reached while, for the purpose of indication, such a sensitivity would be much too great and the greatest indicator deviation is only desired with a deflection of from 10 to 30 degrees from the course to be flown.

Further details of the invention are introduced in the following description of some methods of adaptation.

Figure 1:
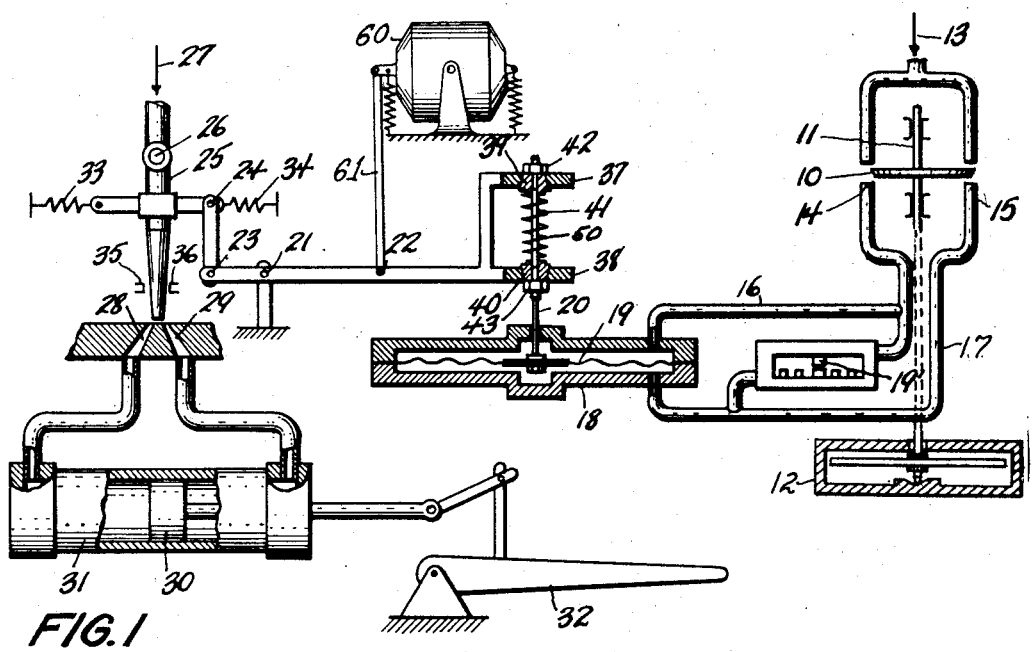
Fig. 1 shows schematically an automatic steering arrangement, omitting all parts not necessary for the comprehension of the invention.

In Fig. 1, 10 indicates an eccentric control disc fastened to axis 11 which axis is controlled, for example, by a magnet needle 12, a directional gyro or any other position maintaining or measuring device adapted for impulse generation. The compressed air, flowing in direction of arrow 13, hits the two orifices 14 and 15 unequally according to the position of the control disc 10, whereby a differential pressure is created in lines 16, 17. Said lines lead to the two sides of housing 18 which encloses the control diaphragm 19, and to the housing of the pneumatically operated course indicator or telemetric compass 19', the motion of which is caused by a pressure sensitive measuring system, not shown but in parallel to diaphragm 19. For a further description of this type of pick-off and remote reading compass see the prior patent to Wunsch No. 1,729,850, dated October 11, 1929, for Steering indicators for aircraft.

The movements of diaphragm 19 are transmitted by pin 20 and lever 22, moving around fulcrum 21, through linkage 23 and 24 to jet pipe power switch 25, movable around axis 26 which is vertical to the plane of the paper. Compressed air or fluid under pressure is fed into the jet pipe in the direction of the arrow 27, whereby a differential pressure acting on the piston 30 of the servo 31 is created by the position of the jet pipe in front of the two dividing openings 28, 29, resulting in the relative displacement of the rudder 32. By means of two centralizing springs 33, 34 the jet pipe is normally kept in its central position. Its movement is limited by stops 35, 36.

The right end of lever 22 is fork-shaped. On each of the two lever ends 37, 38 is a piece 39, 40 conical in shape on the outside and cylindrical on the inside. Both parts are movable on bolt 41 which is attached to pin 20. Helical spring 50 presses with a certain tension the two pieces 39 and 40 against lever ends 37, 38 and against the screws 42, 43, respectively, which rest on the end of bolt 41. Screws 42, 43 are so set that the transmission of movement from pin 20 to lever 22 takes place without any lost motion.

As long as the power transmitted from diaphragm 19 to pin 20 and to lever 22 is less than the spring tension, the diaphragm motion is exactly and rigidly transmitted to the jet pipe. However, if the power necessary to displace the jet pipe attains higher values, for example if the centralizing power of springs 33, 34 overpowers the tension of spring 50 or the jet pipe hits against the stops, the spring will then yield and, according to the direction of motion of pin 20, conical piece 39 or 40 is taken along by nut 42 or by nut 43, respectively, and lifted from its respective seat. Diaphragm 19 can therefore continue to move without moving lever 22. The spring is so designed that its change of length has no material effect on its initial tension. The transmitted turning moment after the lifting off of one of the conical pieces 39, 40 remains practically constant.

The arrangement makes it also possible for the jet pipe to carry out any possible movements inside its stops 35, 36, regardless of the position of diaphragm 19. These movements are derived from the other measuring device such as, for example, a gyro 60 with two degrees of freedom measuring the turning speed of an airplane. For example, when starting a turn by displacing stationary parts 14, 15 of the control transmitter of an automatic steering arrangement, the springy, resilient connection transmits only a fraction of the differential pressure of diaphragm 19 to lever 22 and thus to jet pipe 25. The precession of the rate of turn gyro 60, due to the turning of the plane, exerts an opposing moment on the jet pipe through link 61 and, through the balancing of both impulses, the jet pipe takes a position such that the rudder receives the necessary deflection for the desired rate of turn.

The turning moment transmitted by diaphragm 19 to jet pipe 25 is limited by the initial tension of spring 50. However, the higher control values are indicated by the course indicator 19' whose sensitivity is attuned to the impulse transmitter 10—15.

Figure 2:
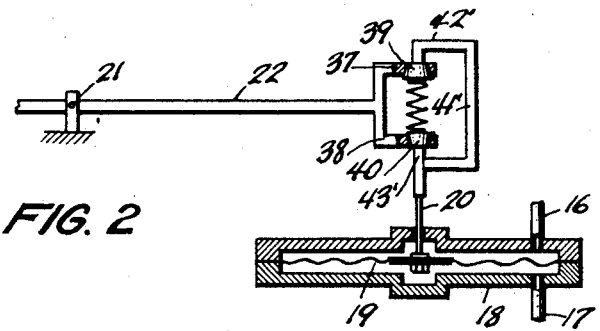
Figs. 2 and 3 show two further forms of the spring or yielding connection under initial tension.

Fig. 2 shows a very similar method of resilient connection held under initial tension. Instead of the bolt 41 piercing the conical pieces 39, 40, there is a fork-like part 41' whose ends 42' and 43' rest against the parts 39 and 40 in a manner similar to that of screws 42 and 43 in Fig. 1.

Figure 3:
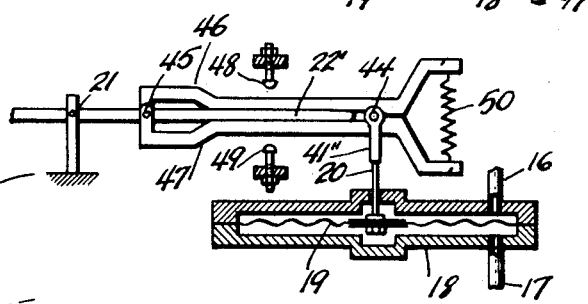

In the arrangement of Fig. 3, the pin 20 carries a fork 41" between whose ends rests pin 44 perpendicular to the plane of the paper. On lever 22', at 45, two levers 46 and 47 are arranged to swing, though normally they lie close to lever 22' under the tension of spring 50. The levers 22', 46 and 47 move together until spring 50 yields, after passing its initial tension, whereby only one of the two levers 46, 47 on lever 22' remains closed while the other one moves away.

It was shown above that the lengthening of spring 50, due to its yielding, should not result in a marked increase of spring tension. For most cases this demand can be met through the choice of a spring which, unsprung, is definitely longer in Figs. 1 and 2, or shorter in Fig. 3, than under initial tension in operating position. However, if the greatest possible impulse exceeds the control value limit by considerable, and if a very accurate maintenance of the transmitted turning moment is desired, limit stops 48, 49, limiting the stroke of the diaphragm, may be supplied and so set that the motion of lever 22' suffices to move the connected power switch to its two terminal positions.

Figure 4:
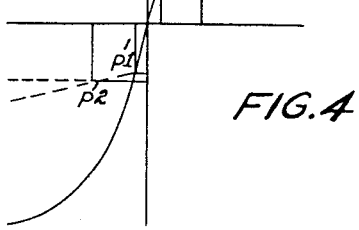
Fig. 4 is a diagram illustrating the principle involved.

In Fig. 4, the line indicating the steering direction of the impulse transmitter 10 to 15 is shown to indicate the effect so gained. The differential pressure acts on diaphragm 19 due to its dependence on the course deviation. At points $P_1$ and $P_1'$, respectively, spring 50 begins to yield so that the force transferred to fork 22' takes the course indicated by the dash lines. The still remaining, slowly growing control value transferred to the power switch originates from the increased tension of spring 50 due to the great diaphragm stroke. If, now, limit stops 48, 49 are added, the curve breaks a second time at points $P_2$ and $P_2'$ and from there on takes a horizontal course, as shown by the dotted line. As shown by the projection of points $P_1$ ($P_1'$) and $P_2$ ($P_2'$) on the abscissa and ordinates, the increase of the transferred moments after the first break of the line indicating the steering direction at points $P_1$ and $P_1'$ is very small, but is greatly exaggerated in the pictorial representation. In practice points $P_1$ and $P_2$ would be permitted to merge, which is permissible because the diaphragm stroke reaching to point $P_1$, the jet pipe must have reached its position against the stop if no reaction has acted on the centralizing springs 33, 34; otherwise the deflection would be insufficient.

In place of the pneumatic impulse transmitter system 10—15, any other desirable measuring system may be used, and jet pipe 25 may also be replaced with another power controller or relay.

What is claimed is:

1. In an automatic steering arrangement for aircraft having a course deviation measuring means, a differential pressure responsive device controlled by said measuring means and a steering control means; a two part linkage for normally directly transmitting the effort exerted by the differential pressure responsive device to said steering control means, said linkage including a normally unyielding spring controlled connection for the respective parts thereof, the spring of said connection being adapted to yield only when the effort of the differential pressure device exceeds predetermined limits, such excess effort being absorbed by the spring so the same is not transmitted by the linkage to the steering control means.

2. In an automatic steering arrangement for aircraft having a course deviation measuring means, a differential pressure responsive device controlled by said measuring means and a steering control means; a two-part linkage for normally directly transmitting the effort exerted by the differential pressure responsive device to said steering control means, said linkage comprising a two-part hinged or forked lever, a pin therebetween connected to said device, a link also therebetween adapted to control said steering device, and a spring yieldingly holding the two parts of said lever against the two sides of said link and pin, whereby said link moves with said pin except when the pressure exerted by said device exceeds the spring tension.

3. In an automatic steering arrangement for aircraft having a course deviation measuring means, a differential pressure responsive device controlled by said measuring means and a steering control means; a two-part linkage for normally directly transmitting the effort exerted by the differential pressure responsive device to said steering control means, said linkage comprising a lever having a C-shaped end, a pair of one-way slip connections for transmitting the movements of said device to said lever, one for each direction, and a compression spring for preventing slip of both connections until the spring force is exceeded.

4. In an automatic steering device for aircraft and the like having a position maintaining means, a rate of turn gyroscope, a differential pressure pick-off at the position maintaining means giving a signal proportional to deviation, and a power amplifying relay including a pressure device responsive to said differential pressure and a power switch actuated therefrom, the combination of a two part linkage which normally directly transmits the effort exerted by the differential pressure responsive device to said power switch, and mechanical connecting means connected to said gyroscope and to said linkage whereby precession of the gyroscope exerts an impulse on said linkage and power switch in opposition to that exerted by the differential pressure responsive device to balance both impulses, said linkage including a normally unyielding spring controlled connection for the respective parts thereof, the spring of said connection being adapted to yield only when the effort of the differential pressure device exceeds predetermined limits, such excess effort being absorbed by the spring so the same is not transmitted by the linkage to the power switch.

WALDEMAR MÖLLER.
ADAM KRONENBERGER.